United States Patent [19]

Isono et al.

[11] Patent Number: 4,893,701
[45] Date of Patent: Jan. 16, 1990

[54] CONTROLLING DEVICE FOR AUTOMATIC SPEED CHANGE MECHANISM

[75] Inventors: Nobuyuki Isono; Nobuyasu Suzumura, both of Aichi, Japan

[73] Assignee: Aisin Seiki Kabushiki Kaisha, Aichi, Japan

[21] Appl. No.: 323,907

[22] Filed: Mar. 15, 1989

[30] Foreign Application Priority Data

Mar. 15, 1988 [JP] Japan .................................. 63-60945

[51] Int. Cl.⁴ ............................................. B60K 41/26
[52] U.S. Cl. ...................................... 192/4 A; 74/866
[58] Field of Search ................. 74/861, 862, 866, 867; 192/4 A; 364/424.1

[56] References Cited

U.S. PATENT DOCUMENTS

| | | | |
|---|---|---|---|
| 4,526,065 | 7/1985 | Rosen et al. | 74/867 X |
| 4,562,906 | 1/1986 | Barbagli et al. | 192/4 A |
| 4,572,340 | 2/1986 | Pierce | 192/4 A X |
| 4,644,826 | 2/1987 | Kubo et al. | 74/866 |
| 4,653,622 | 3/1987 | Miyake | 74/866 |
| 4,665,777 | 5/1987 | Kokuchi | 74/866 |
| 4,732,055 | 3/1988 | Tateno et al. | 74/866 |
| 4,768,610 | 9/1988 | Pagel et al. | 192/4 A X |
| 4,803,899 | 2/1989 | Kumura | 74/866 |
| 4,829,435 | 5/1989 | Isono | 74/866 X |

Primary Examiner—Dwight G. Diehl
Attorney, Agent, or Firm—Sughrue, Mion, Zinn, Macpeak & Seas

[57] ABSTRACT

A controlling device for an automatic speed change mechanism is capable of preventing a sudden acceleration of an automobile against the intention of the driver. The device includes a shift position detector for emitting electric signals indicating the selection state of a manual shift device; a braking detector for emitting electric signals corresponding to the actuation/non-actuation of a braking device; and an electronic controlling device which monitors the electric signals emitted by said shift position detector and said braking detector, controls the said shifting device corresponding to the selection state of a manual shifting device to switch over the connection mode of the speed change mechanism, and during the non-actuation of the braking device, if the manual shifting device commands a switch-over from the non-connection mode to a connection mode, establishes a connection mode having a relatively small reduction ratio compared with the case of brake actuation.

3 Claims, 7 Drawing Sheets

CONTROLLING DEVICE FOR AUTOMATIC SPEED CHANGE MECHANISM

FIELD OF THE INVENTION

The present invention relates to a controlling device for an automatic speed change mechanism used in automobiles, and particularly to a device for the prevention of sudden acceleration of the automobile against the will of the driver.

BACKGROUND OF THE INVENTION

Recently automobiles having an automatic speed change mechanism have run wild causing considerable damage, injuries and even death. Such wild running of automobiles can be attributed to the fact that, even if the driver does not press the accelerator, the rotational speed of the automobile engine is increased for no apparent reason. In automobiles in which automatic speed change mechanism are not provided, the driver presses the clutch at the time of starting the automobile, and the clutch is slowly and smoothly engaged. Therefore, even if the rotational speed of the engine is abnormally increased, the wild running of the automobile can be avoided because the driver can instantly detach the clutch. However, there is no clutch in an automatic transmission and, if the shift lever is switched from the neutral to the drive range, the automobile is accelerated correspondingly with the rotational speed of the engine. Therefore, if there is an abnormal increase of the rotational speed of the engine, a certain degree of wild running of the automobile cannot be avoided, at least for the time interval elapsing before the driver presses the brake.

Such a problem can be avoided if the driver presses the brake pedal when he shifts the shift lever from the neutral to the drive range. However, since the driver is a human being, it is difficult to observe such kind precautions, and therefore, the problem seems to remain as an unavoidable one. In this connection, in some automobiles, a mechanical device is installed which prevents the driver from shifting the shift lever from the neutral to the drive range without first pressing the brake pedal. By means of the above mentioned mechanical device, a sudden wild running of the automobile can be avoided, but in order to make it practical, a large number of mechanical components have to be arranged around the shift lever and the brake pedal. Furthermore, the related parts of the automobile have to be adapted to receive the new mechanical components, thereby increasing the manufacturing cost.

SUMMARY OF THE INVENTION

Therefore, it is the object of the present invention to provide a device for the prevention of sudden acceleration of an automobile against the will of the driver, without incurring large expenses.

In achieving the above object, the device of the present invention is constituted such that a means for monitoring the actuation state of the braking devices such as the foot brake or the parking brake is provided. When the manual shift mean such as the shift lever for speed change is shifted from the uncoupled of neutral position to the coupled position, if the brake is not in an actuation state, a speed change step having a small reduction ratio is selected.

In the existing automatic speed change mechanisms for use in automobiles, if the shift lever is switched to the drive range, the input and output shafts of the speed change mechanism are mechanically engaged with each other through a plurality of gears due to the function of an hydraulic circuit. However, the speed change steps consist of 3 or 4 steps having respectively different reduction ratios. These speed change steps are selected by means of a controlling function of a solenoid. Generally, if the shift lever is switched from the neutral to the drive range at the stopped state of the automobile, an electronic controlling device selects a speed change step having the largest reduction ratio, that is, having the largest driving torque. Through this procedure, the automobile can obtain the highest accelerating characteristics at the initial running of the automobile. However, if a speed change step having a small reduction ratio is selected, the driving torque of the output shaft of the speed change mechanism becomes small, and therefore, the automobile will not move at all or will move very slowly.

Accordingly to the present invention, if the shift lever is switched from the neutral to the drive range without pressing down the brake pedal, then a speed change step having a small reduction ration such as the third speed or the fourth speed will be selected, and therefore, even if the rotational speed of the engine is abnormally high, a sudden wild running of the automobile will not occur. On the other hand, if the brake is in the actuation state, even if the revolution speed of the engine is abnormally high, no such sudden wild running of the automobile will occur, and therefore, the speed change step of the first speed can be selected.

BRIEF DESCRIPTION OF THE DRAWINGS

The above object and other advantages of the present invention will become more apparent by describing the preferred embodiment of the present invention with reference to the attached drawings in which.

DETAILED DESCRIPTION OF THE PREFERRED EMBODIMENTS

Figure 2:
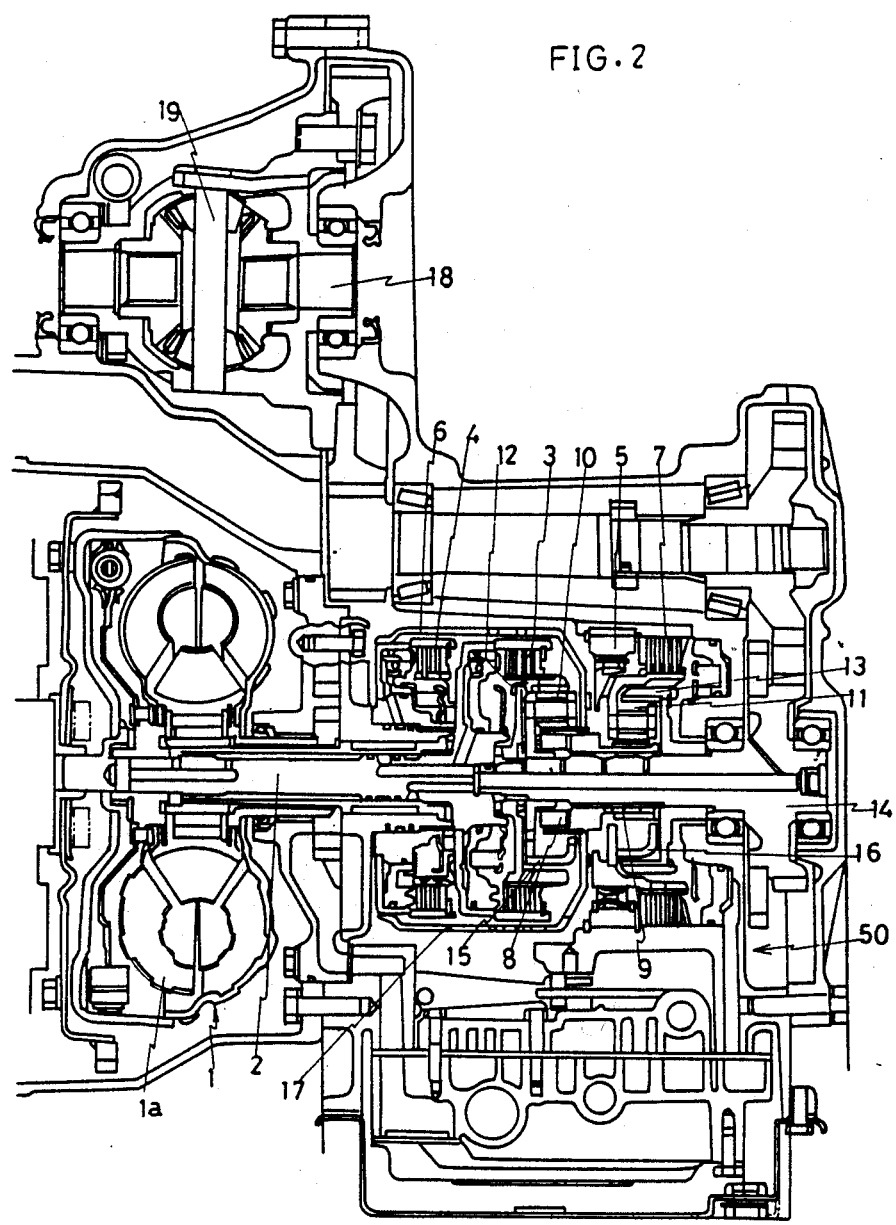
FIG. 2 is a frontal view showing the internal structure of the mechanism of the automatic speed change mechanism according to the embodiment of the present invention.

FIGS. 2 illustrates the construction of the mechanical part of the automatic speed change mechanism as an embodiment of the present invention. The construction and function of this speed change mechanism will be described referring to FIG. 2.

The engine crank shaft (not shown) is connected to a torque converter 1 having a turbine 1a and the turbine 1a is connected to an input shaft 2 of a planetary gear unit 50. The planetary gear unit 50 comprises controlling components such as a front clutch 3, a direct clutch 4, a one way clutch 5, brakes 6,7 and gears such as a front sun gear 8, a rear sun gear 9, a front planetary gear pinion 10, a rear planetary gear pinion 11, a front planetary ring gear 12 and a rear planetary ring gear 13.

The front sun gear 8 and the rear sun gear 9 are integrally formed together, and are disposed on the outer circumference of an output shaft 14 in a manner capable of free revolutions. The front planetary gear pinion 10 is meshed with the outer circumference of the front sun gear 8, while the rear planetary gear pinion 11 is meshed with the outer circumference of the rear sun gear 9. The inner circumferences of the front planetary ring gear 12 and the rear planetary ring gear 13 are respectively provided with teeth for meshing with the front planetary gear pinion 10 and the rear planetary gear pinion 11. Therefore, the front planetary gear pinion 10 is disposed between the outer circumference of the front sun gear 9 and the inner circumference of the front planetary ring gear 12, being meshed with them at all times. Further, the rear planetary gear pinion 11 is disposed between the outer circumference of the rear sun gear and the inner circumference of the rear planetary ring gear 13, being meshed with them at all times.

Attention is called to the fact that the descriptions below will be made based on the assumption that all the revolving components are observed from the left side of FIG. 2 toward the right side.

First, the case in which the gear of the first speed is selected will be described. Under this condition, the front clutch 3 is engaged, the direct clutch 3 is disengaged, and the brake 6 is put in an OFF state. Accordingly, a clockwise driving torque imposed on the input shaft 2 will be transmitted through the front clutch 3 to the front planetary ring gear 12, thereby making the gear 12 revolve clockwise. Therefore, a clockwise revolution force will be transmitted to a front carrier 15 which supports the front planetary gear pinion 10 which in turn is meshed with the gear 12. Meanwhile, the front sun gear 8 receives a counterclockwise revolution force from the pinion 10 and transmits this force through the rear sun gear 9 to the rear planetary gear pinion 11, thereby applying a counterclockwise revolution, and therefore, the revolution of the rear carrier 16 is prevented. Accordingly, the pinion 11 revolves clockwise, and the rear planetary ring gear 13 which is meshed with the pinion 11, is driven in the clockwise direction. Since the front carrier 15 and the rear planetary ring gear 13 are connected to the output shaft 14, this shaft 14 is driven in the clockwise direction. In this case the first speed has a reduction ratio of 2.7.

Now the case in which the gear of the second speed is selected will be described. Under this condition, the front clutch 3 is engaged, the direct clutch 4 is disengaged, and the brake 6 is placed in an ON position. Accordingly, a clockwise driving torque imposed on the input shaft 2 is transmitted through the front clutch 3 to the front planetary ring gear 12, thereby making the gear 12 revolve in the clockwise direction. Therefore, a clockwise revolution force is applied on the front carrier 15 which supports the front planetary gear pinion 10 which in turn is meshed with the gear 12.

Meanwhile, the front sun gear 8 receives a counterclockwise revolution force from the pinion 10, but the revolution is prevented by the function of the brake 6 and therefore no revolution force is transmitted to the rear planetary gear pinion 11. Accordingly, due to the revolution of the front carrier 15 which is caused by the reverse of the front planetary pinion 10, the driving force is transmitted to the output shaft 14, thereby making the shaft 14 revolve clockwise. In this case the second speed has a reduction ration of 1.5. Now the case of the gear of the third speed will be described. Under this condition, both the front clutch 3 and the direct clutch 4 are engaged. Accordingly, the front sun gear 8 and the front planetary ring gear 12 are driven in the same speed and therefore, the front planetary gear pinion 10 is put in a locked state. Therefore, the front carrier 15 revolves at the same speed as the input shaft 2 and the output shaft 14 also revolves at the same speed as the input shaft 2. That is, the reduction ration in this case is 1.

Now the case in which the reverse gear is selected will be described. Under this condition, the front clutch 3 is disengaged, the direct clutch 4 is engaged, and the brake 7 is put in an ON position. Accordingly, a clockwise driving torque imposed on the input shaft 2 is transmitted through a drum 17 to the rear sun gear 9. Therefore, a clockwise revolution force is applied on the rear carrier 16 which supports the rear planetary gear pinion 11, but due to the function of the brake 7, the revolution of the rear carrier 16 is prevented. Accordingly, the rear planetary ring gear 13 is also driven in the counterclockwise direction. Accordingly, the output shaft 14 which is coupled with the gear 13 is also driven in the counterclockwise direction.

Thus, the speed change mechanism illustrated in FIG. 2 can be set to one of the connections with "non-connection", with any of the three "advance reduction ratio" or one "reverse reduction ratio".

Figure 3A:
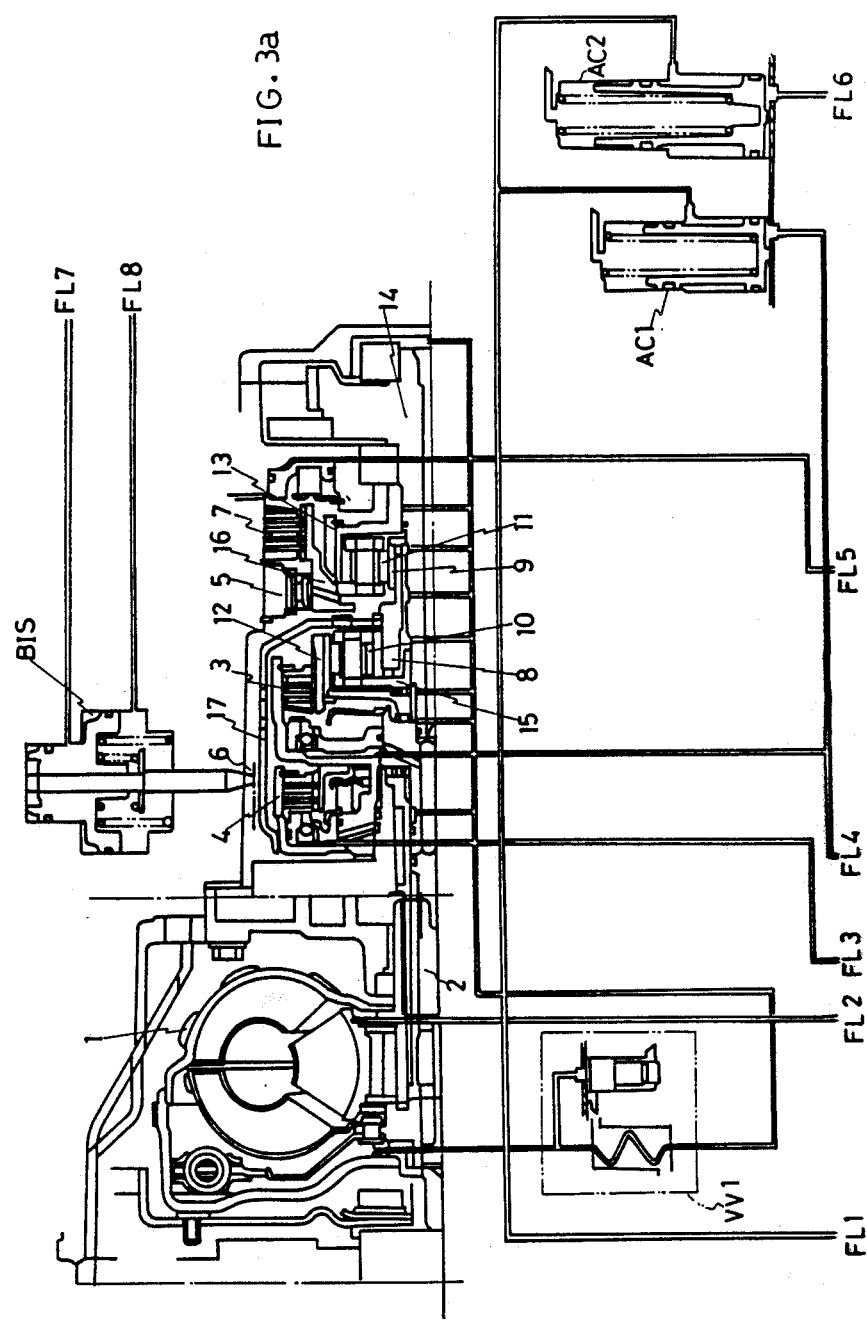
FIGS. 3a and 3b are block diagrams showing the constitution of the hydraulic circuit provided in the speed change mechanism of FIG. 2.
Figure 3B:
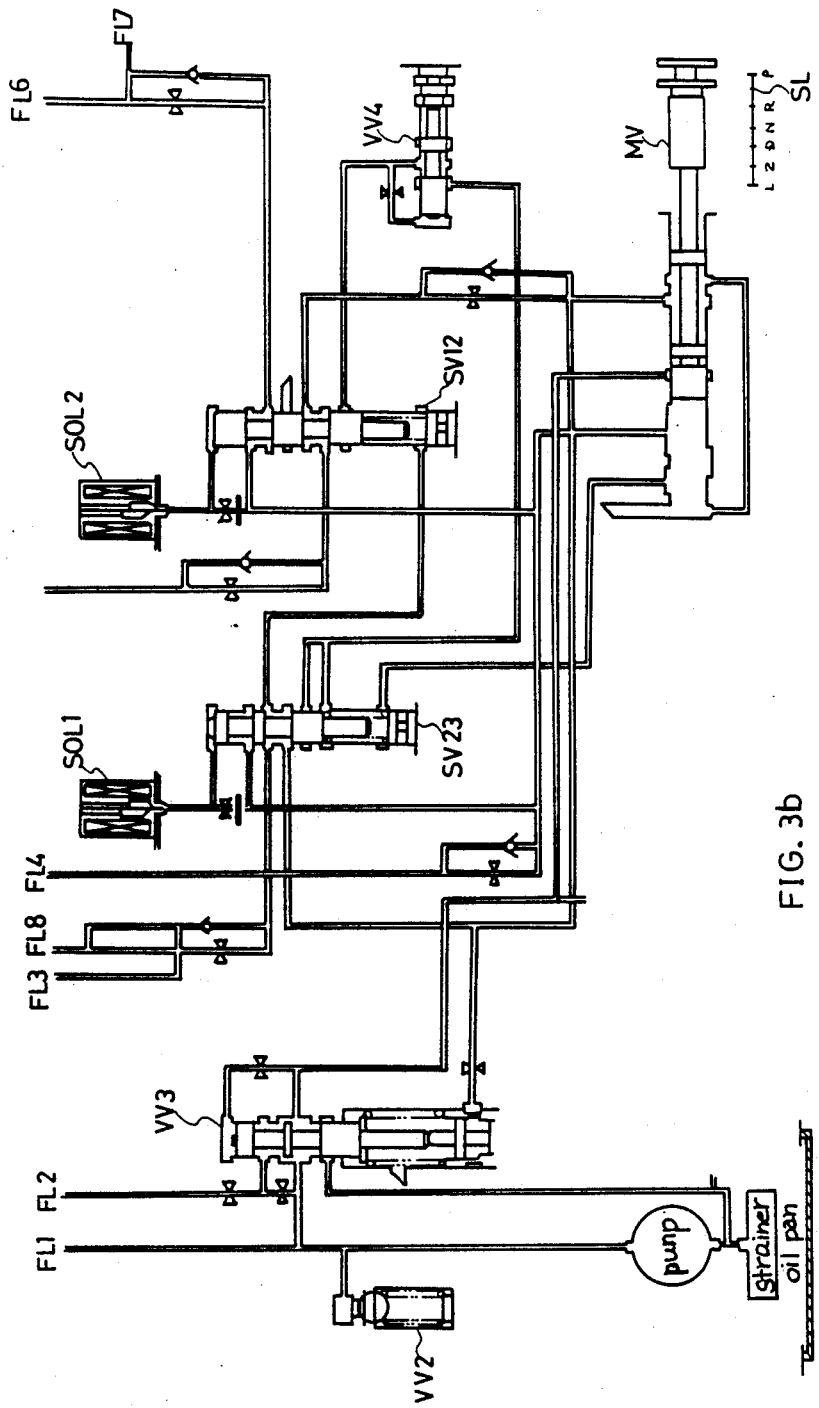

FIGS. 3a and 3b illustrate the construction of the hydraulic circuit for controlling the speed change mechanism of FIG. 2. Referring to these drawings, the hydraulic circuit comprises a cooler bypass valve VV1, a pressure relief valve VV2, a primary regulator valve VV3, a low cost modulator valve VV4, a 1-2 speed shift valve SV12, a 2-3 speed shift valve SV23, shift control solenoid valves SOL1, SOL2, and a manual valve MV. Reference code BIS indicates a servocontrol constituting the brake 6.

The manual valve MV is actuated in an interlocked state with the shift lever SL which is disposed near the driver's seat for selecting the speed change step, and the manual valve MV has 6 ranges: P, R, N, D, 2 and L. The hydraulic circuit controls the speed change mechanism by means of the combined function of the selected range of the manual valve MV and the ON/OFF state of the shift control solenoid valves SOL1, SOL2. The above described speed change mechanism and the hydraulic circuit do not differ much when compared with conventional ones and therefore no further detailed descriptions will be presented.

Figure 4:
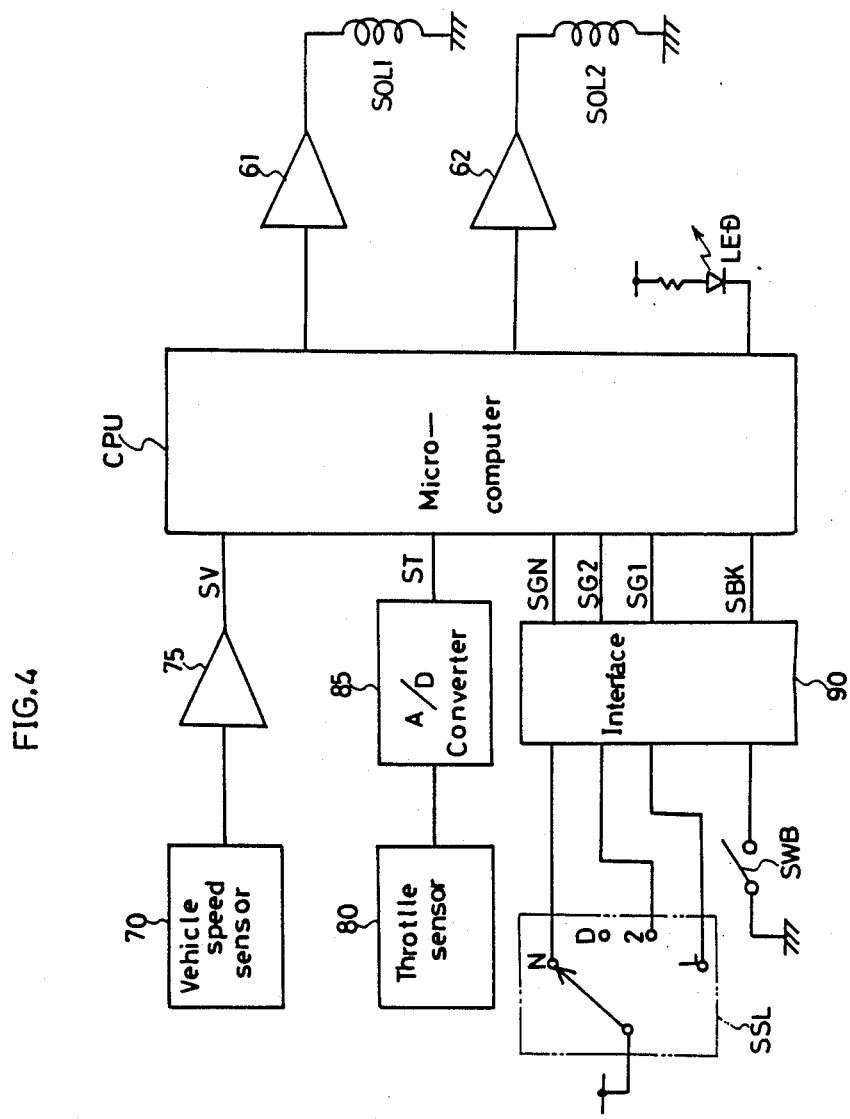
FIG. 4 is a block diagram showing the constitution of the controlling circuit for/controlling the automatic speed change mechanism according to the embodiment of the present invention.

FIG. 4 illustrates the construction of the electric circuit for controlling the hydraulic circuit illustrated in FIGS. 3a and 3b. Referring to FIG. 4, there is installed a microcomputer CPU for controlling the shift control solenoid valves SOL1, SOL2. The solenoids of the shift control solenoid valves SOL1, SOL2 are connected respectively through the drivers 61, 62 to the output port of the microcomputer CPU. An automobile speed sensor 70 emits pulse signals corresponding to the number of revolutions of the speedometer cable. Therefore the automobile speed can be known if the frequency of the repeated pulse signals is measured. The output terminal of the automobile speed sensor 70 is connected through a signal processing circuit 75 to the input port of the microcomputer (CPU). A throttle sensor 80 emits analgue signals corresponding to the degree of opening of the throttle valve. These signals are converted into digital signals by means of an A/D converter 85 and are supplied to the input port of the microcomputer CPU as throttle opening degree signals ST.

Three signals emitted by a shift switch SSL which is interlocked with the position of the speed change shift lever indicated by SL in FIG. 3b, are supplied through an interface circuit 90 to the input port of the microcomputer CPU as signals SGN, SG2 and SGL. That is, when the shift lever is positioned at the N (neutral) range, the signal source for the signal SGN is put to the ON position (the high level H), while the signal sources of the signals SG2, SGL are put to the OFF position. If the shift lever is switched over to the D (drive) range, the signals SGN, SG2, SGL are all switched off. If the shift lever is switched over to the "2" (the second speed) range, the signal SG2 is turned on, and the signals SGN, SGL are turned off. If the shift lever is switched over to the L (the first speed) range, the signal SGL is turned on, and the signals SGN, SGL are turned off. Here, attention is called to the fact that the first and second speeds of the selection ranges of the shift lever are different from the first and second speeds of the speed change mechanism.

Reference code SWB indicates a brake switch which is turned on or off in an interlocked state with the ON/OFF state of the foot brake pedal. The signal emitted by the switch SWB is supplied through the interface circuit 90 to the input port of the microcomputer CPU as a signal SBK. A light emitting diode LED which is connected to the output port of the microcomputer CPU is a warning lamp for indicating as to whether the speed change mechanism controlling device is in a sudden acceleration prevention mode or not.

Figure 6:
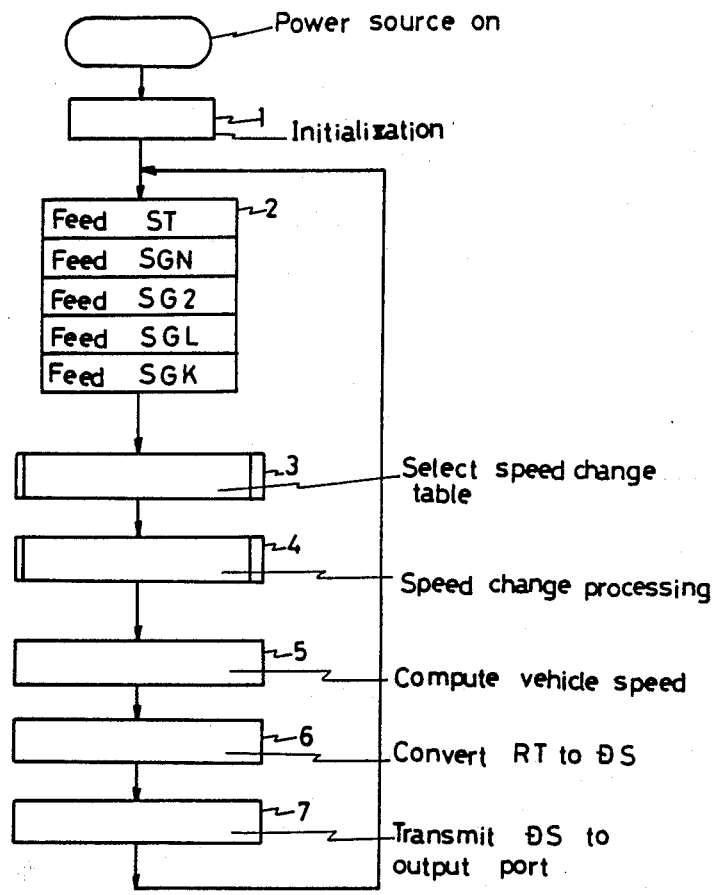
FIG. 6 is a flow chart showing schematically the operations of the microcomputer (CPU) of FIG. 4.

FIG. 6 illustrates schematically the operation of the microcomputer CPU of FIG. 4. The operation of the CPU will be described referring to FIG. 1. Upon turning on the power source, initialization is established. That is, the internal memory of the CPU will be cleared, the output port will be initialized, the time and the interruptor will be set up, and various parameters will be reset. Although not illustrated in the drawings, when the initialization is completed, an interruption request will be given to the microcomputer CPU at every upcoming edge of the automobile speed signal SV. If an interruption request comes, the CPU carries out the interruption process (not shown) and will increment the content of the automobile speed register (the internal memory). Further, upon completion of the initialization, the time TM1 will start. At step 2, the throttle opening degree signal ST, the shift lever position signals SGN, SG2, SGL and the brake signal SBK are sequentially fed into the input port to be stored in the pertinent memories.

Figure 5A:
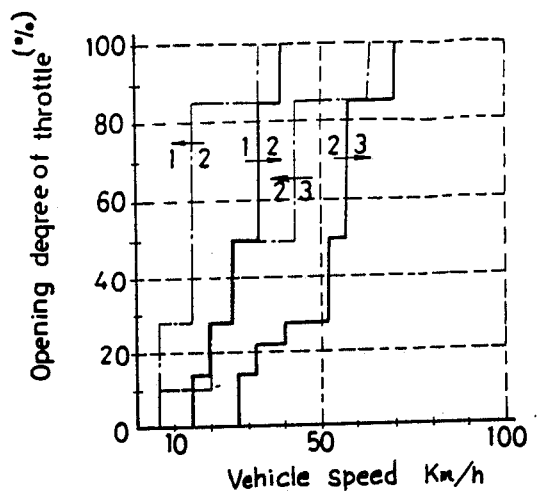
FIGS. 5a, 5b and 5c are graphs showing respectively the speed change schedules for "D". "2" and "L" ranges of the automatic speed change mechanism according to the embodiment of the present invention.
Figure 5B:
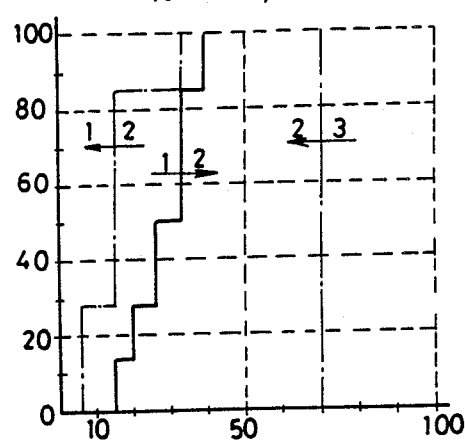
Figure 5C:
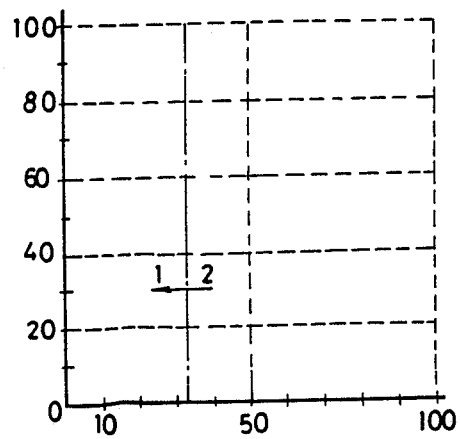

The speed change step selected by the automatic speed change mechanism is determined based on a predetermined schedule correspondingly with the current automobile speed and the throttle opening degree, the predetermined schedule being different from each selection range of the shift lever. That is, if the shift lever is at the position of the "2" range, the schedule represented by the graph of FIG. 5b is used; if the shift lever is at the L range, the schedule represented by the graph of FIG. 5c is used; and at the other range, i.e., the D range, the schedule given by the graph of FIG. 5a is used. Such selection of schedule correspondingly with the selection of the range by the shift lever is processed at step 3. More specifically, different sets of information corresponding to the graphs of FIGS. 5a, 5b and 5c are stored respectively in different sections of the memory of the microcomputer CPU in the form of speed change tables. Thus, at step 3, a selection is made of the proper table from among the speed change tables for reference. In FIGS. 5a, 5b and 5c, the schedules for switching over from the low speed steps (large reduction ratio) to the high speed steps are shown by solid lines, while the schedules for switching over form the high speed steps to the low speed steps are shown by dotted lines.

At step 4, the table of the schedule selected at step 3 is referred to and if there is a need for a speed change, the content of the speed change register RT is renewed based on the schedule. The content of the speed change register RT is 1, 2 or 3 means respectively the selection of the first, second or third speed gear. At step 5, the value in the timer TM1 is referred to and for every certain predetermined time, the timer TM1 is cleared and the automobile speed is computed based on the content of the automobile speed register (the value represented by the pulses). At step 6, based on the content of the speed change register RT, controlling data DS is formed for controlling the solenoid valves SOL1, SOL2. This is done by referring to the conversion table which is established in the memory in advance.

At step 7, the control data DS obtained at step 6 is output from the pertinent output port and the solenoid valves SOL1, SOL2 are switched off from the energized state. The contents of the conversion table referred at step 6 are as shown in the Table below.

TABLE 1

| RT (Speed change step) | DS SOL1 | SOL2 |
| --- | --- | --- |
| 1 | 1 (ON) | 0 (OFF) |
| 2 | 1 (ON) | 1 (ON) |
| 3 | 0 (OFF) | 1 (ON) |

Figure 1:
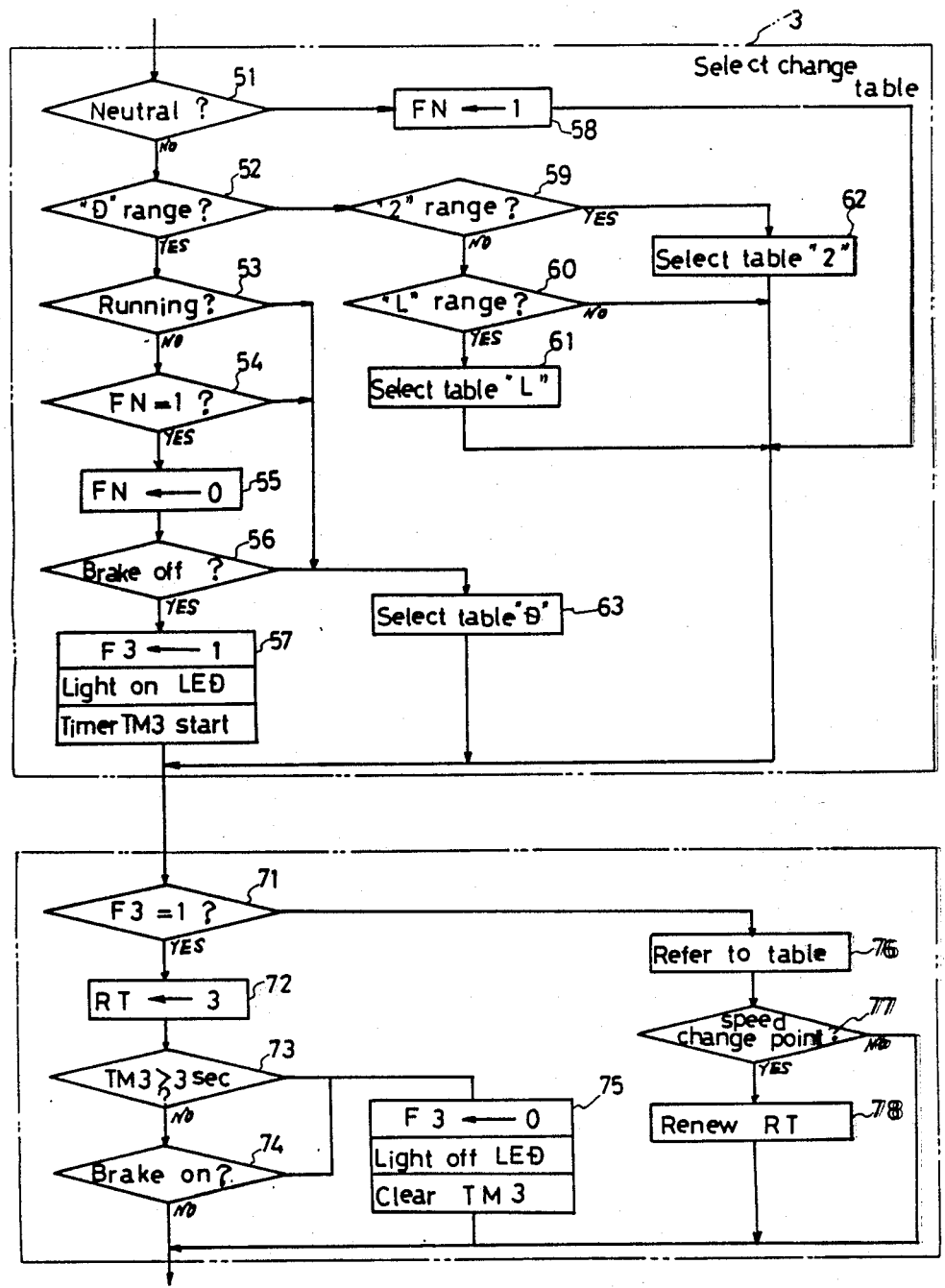
FIG. 1 is a flow chart showing a part of the processing of FIG. 6.

Now the controls will be described for prevention of sudden accelerations. The selection and processing of a speed change table of FIG. 6 and its specific details are shown in FIG. 1. When the shift lever is at the position of the neutral range, the operation is transferred from step 51 to step 58, and the neutral flag FN is set to 1. If the shift lever is switched to the "2" range, the operation is advanced to steps 51, 52, 59 and 62, and the speed change table for the "2" range is selected. If the shift lever is switched to the L range, the operation is advanced to steps 51, 52, 59, 60 and 61 and the speed change table for the L range is selected. If the shift lever is switched to the D (drive) range, either the table for the D range is selected or a sudden acceleration prevention mode will be adopted, corresponding to the current situation. At step 53, a check will be made as to whether the automobile is running or not by referring to the automobile speed. If the automobile is running, the operation is advanced to step 54, and the neutral flag FN is referred to. In the case where FN is 1, if it is immediately after the switching over of the shift lever from the neutral to drive range, the neutral flag FN is cleared to 0 at step 55, and a check is made as to whether the brake pedal is pressed down or not at step 56 by referring to the brake signal SBK. If the brake pedal is in a depressed state, the operation is advanced to step 57 where the sudden acceleration prevention flag F3 is set to 1, the warning lamp LED is lighted and the timer TM3 is started. Thus a sudden acceleration prevention mode is established.

Now the speed change operation will be described. At step 71, a check is made about the state of the sudden acceleration prevention flag F3. Usually, this flag F3 is 0 and therefore, steps 76, 77 and 78 are carried out, thereby renewing the contents of the speed change register RT based on the schedule of the selected table.

At step 71, if the sudden acceleration prevention flag F3 is set to 1, then a numeral 3 is stored into the speed change register RT at step 72 and the third speed is selected. At step 73, a check is made as to the existence of a timing out of the timer TM3 and at step 74, a check is made as to the ON/OFF state of the brake switch SWB. That is, in the case where 3 seconds have elapsed from the time the sudden acceleration prevention mode is entered or in the case where the brake switch SWB in an ON state (upon pressing of the brake pedal by the driver), it is decided that there is no apprehension for a sudden acceleration. In this case, the operation is advanced to step 75 where the sudden acceleration prevention flag F3 is cleared to 0, the warning lamp LED is de-energized and the timer TM3 is cleared.

In an ordinary automatic speed change mechanism, for example, if the driver switches the shift lever from the neutral to the drive range at the stopped state of the automobile, first the first speed having the largest reduction ratio and having the largest driving torque is selected based on the speed change schedule of FIG. 5a. However in this case, if the rotational speed of the engine is abnormally high due to some disorder of the engine, there is the possibility that the automobile can be suddenly accelerated and can run wild. However, if the driver is keeping the brake pedal pressed down, there is no apprehension of a sudden acceleration.

In this embodiment, as clearly illustrated in FIG. 1, if the brake pedal is not pressed down by the driver during the time the shift lever is switched from the neutral to the drive range, the operation enters into a sudden acceleration prevention mode, and at the same time, the third speed having the smallest reduction ratio and having the smallest driving torque is forcibly selected.

If the shift lever is at the neutral position, the speed change mechanism is in such a state that its input shaft and output shaft are disconnected from each other while, if the shift lever is switched over from the neutral to the drive range, the input and output shafts of the speed change mechanism are connected to each other due to the function of the hydraulic circuit. That is, as there is no clutch, as long as the shift lever is at the drive range, the automobile can be moved at any time. But in the ordinary case of starting, if the first speed having the largest reduction ratio is selected, there is the possibility of a sudden acceleration while, on the other hand, if the third speed is selected, the driving torque of the speed change mechanism becomes very small and therefore there will be no sudden acceleration even if the rotational speed of the engine rises abnormally high. In the above example, the speed change mechanism is provided with three speed change steps, but if the speed change mechanism is provided with four speed change steps, the fourth step can be selected for the sudden acceleration prevention mode. Further, for example, even in the case where the second speed is selected for the sudden acceleration prevention mode, the possibility of an actual sudden acceleration can be reduced compared with the case of selecting the first speed, thereby bringing some better result.

Further, in said embodiment, when the shift lever is switched over from the neutral to the D range, the decision as to whether a sudden acceleration prevention mode will be adopted or not is made by discriminating as to whether the brake pedal is kept pressed down or not. However, for example, in the case where a parking brake or other braking means is provided, there is also no apprehension of a sudden acceleration and therefore, in such a case, the adoption of a sudden acceleration prevention mode can also be excluded.

According to the device of the present invention described above, if the shift lever is switched over without pressing down of the brake pedal, a sudden acceleration prevention mode is adopted in which a speed change step having a smaller reduction ration than the usual is selected, and therefore, even if the rotational speed of the engine rises abnormally high against the intention of the driver, a sudden acceleration of the automobile can be prevented.

What is claimed is:

1. A controlling device for an automatic speed change mechanism comprising:
    a speed change mechanism adapted to be disposed between an engine of an automobile and an output shaft and adapted to be connected in one of a plurality of modes such as connected states having different reduction ratios and a non-connected state;
    a switching means for the connection modes of the said speed change mechanism;
    a shift position detection means for emitting electric signals indicating the selection state of a manual shift means for shifting the connection mode of the said speed change mechanism;
    a braking detection means for emitting electric signals corresponding to the actuation/non-actuation of a braking device; and
    an electronic controlling means for monitoring the electric signals emitted by said shift position detection means and said braking detection means, controlling said switching means corresponding to the selection state of manual shifting means to switch over the connection mode of said speed change mechanism, and during the non-actuation of the braking device, if the manual shifting means commands a switch-over from the non-connected state to a connected state, establishes a connected state having a relatively small reduction ratio compared with the case of brake actuation.

2. A controlling device for an automatic speed change mechanism as claimed in claim 1, wherein under the condition of non-actuation of the braking device, if the manual shifting means commands a switch-over of the said speed change mechanism from the non-connected state to a connected state, said electronic controlling means establishes a connection state having a relatively small reduction ratio compared with the case of the brake actuation, and after the elapse of a predetermined period of time, said electronic controlling means restores it to a connection state having the same reduction ratio as in the case of brake actuation.

3. A controlling device for an automatic speed change mechanism as claimed in claim 1, wherein under the condition of non-actuation of the braking device, if the manual shifting means commands a switch-over of the said speed change mechanism from the non-connected state to a connected state, said electronic controlling means establishes a connection state having a relatively small reduction ratio compared with the case of the brake actuation, and upon switching-over of the braking device to the actuation state, the said electronic controlling means switches it over to a connection state having a greater reduction ratio than before.

* * * * *